No. 865,417. PATENTED SEPT. 10, 1907.
I. N. MITCHELL.
ANTISLIPPING DEVICE FOR TRACTION ENGINES.
APPLICATION FILED JULY 13, 1906.
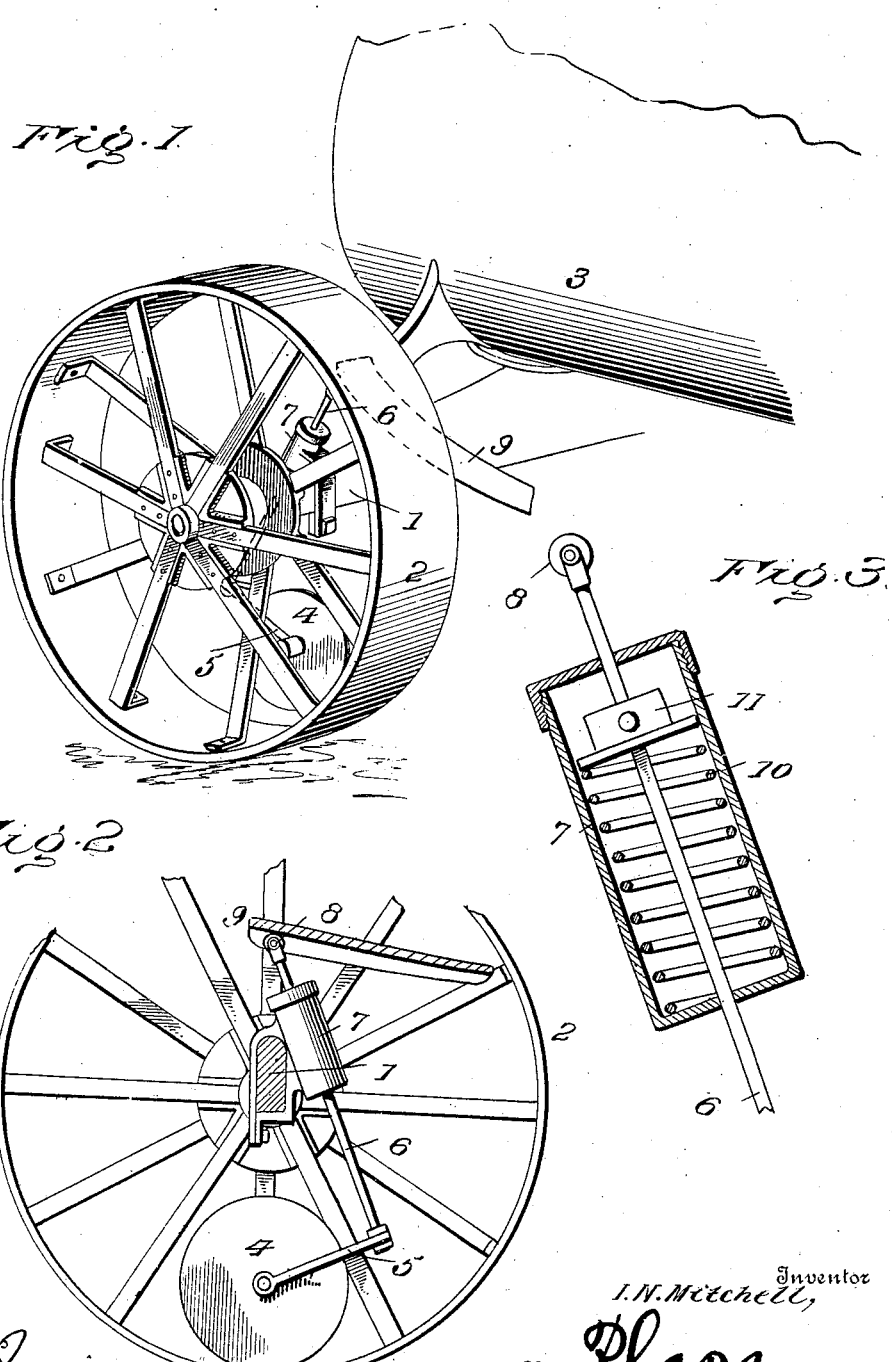
Inventor
I. N. Mitchell,

UNITED STATES PATENT OFFICE.

ISAIAH N. MITCHELL, OF BELL CITY, LOUISIANA.

ANTISLIPPING DEVICE FOR TRACTION-ENGINES.

No. 865,417.  Specification of Letters Patent.  Patented Sept. 10, 1907.

Application filed July 13, 1906. Serial No. 326,073.

*To all whom it may concern:*

Be it known that I, ISAIAH N. MITCHELL, a citizen of the United States, residing at Bell City, in the parish of Calcasieu and State of Louisiana, have invented certain new and useful Improvements in Antislipping Devices for Traction-Engines, of which the following is a specification.

This invention is designed to obviate slipping of the steering wheels of traction engines and mechanically propelled road engines when attempting to depart from a straight course upon soft ground or grades.

The invention consists of retarders arranged to coöperate with the steering wheels and movable therewith and which are normally out of action when the steering wheels are set for a straight course and which are depressed and caused to enter the surface of the ground when the steering wheels are moved to deflect the machine to one side or the other of a straight course.

The invention contemplates, in combination with the retarders or anti-slipping means, a contrivance whereby the retarders are depressed more or less according to the angular inclination of the steering wheels when departing from a straight line.

For a full description of the invention and the merits thereof and also to acquire a knowledge of the details of construction of the means for effecting the result, reference is to be had to the following description and accompanying drawings, in which:—

Figure 1 is a perspective view of a steering wheel and portion of a traction engine showing the application of the invention. Fig. 2 is a side view of the parts shown in Fig. 1. Fig. 3 is a sectional detail view of the box which is attached to the axle and through which the stem of the retarder or anti-slipping device passes, showing the parts on a larger scale.

Corresponding and like parts are referred to in the following description and indicated in all the views of the drawings by the same reference characters.

The invention is applicable to traction engines, road vehicles and like mechanically propelled machines equipped with steering wheels. It is proposed to provide a retarder or anti-slipping device for each steering wheel, although one, only, is illustrated in the accompanying drawings.

The numeral 1 indicates the axle of the traction engine or other machine equipped with the invention. The steering wheel 2 is mounted with reference to the axle in any accustomed way so as to admit of proper guidance of the machine according to the type of steering apparatus embodied in the construction thereof. The numeral 3 designates the body of the traction engine or other vehicle or road machine. These parts 1, 2 and 3 may be of any construction and are selected to illustrate the application of the invention.

The retarder 4 or anti-slipping device preferably appears in the form of a disk sharpened at its peripheral edge so as to penetrate the surface of the ground and prevent slipping of the machine when deflected from a straight course. The disk form of retarder or anti-slipping device is preferred because it offers the least resistance to penetrate the ground when depressed so as to be projected below the tread of the steering wheel. The fork, frame or support 5 of the retarder 4 has loose connection with the lower end of a stem 6 so as to turn to any angular position with the steering wheel 2. The stem 6 passes loosely through a box 7 attached to the axle 1 in any substantial way and is provided at its upper end with a roller 8 to travel upon a track 9 attached to the body 3 of the machine. A spring 10 is arranged within the box 7 and is confined between the bottom of said box and a stop 11 adjustable upon the stem 6 and consisting of a collar secured to the stem in an adjusted position by means of the said screw. The spring 10 normally exerts an upward pressure upon the stop 11 and holds the retarder or anti-slipping device 4 elevated, the degree of elevation being determined by adjustment of the stop 11, as will be readily understood. The track 9 inclines so that upon turning the steering wheel from a straight course, the roller 8 will ride upon the track and be depressed thereby and consequently project the retarder or anti-slipping device below the tread of the steering wheel to cause it to enter the surface over which the machine is traveling and prevent slipping thereof. The degree of depression or projection of the retarder below the tread of the steering wheel will depend upon the angular deflection of the steering wheel, hence upon making a short turn the retarder will be depressed and caused to penetrate the surface of the ground a greater distance than when the steering wheel is turned to make a long curve. The track 9 inclines in one direction from a given point so as to effect depression of the retarder on the inner circle according as the machine is turned either to the right or to the left. The retarder or anti-slipping device 4 is arranged to run close to the rim of the steering wheel and the box or like part 7 is attached to the axle or steering wheel support close to the inner end of the hub, the purpose being to have the attachment move with the steering wheel, and by having the retarder arranged close to the steering wheel, the latter forms a brace therefor.

Having thus described the invention, what is claimed as new is:

1. In combination with the steering wheel of a road machine, a retarder or anti-slipping device coöperating therewith, supporting means for said retarder, and an inclined track to effect depression of the retarder upon moving the steering wheel from a direct course.

2. In combination, a steering wheel, a retarder or anti-slipping device coöperating therewith, a stem having the retarder connected therewith, a spring normally supporting the retarder in a given position, and an inclined track adapted to effect depression of the retarder and the change or deflection of the steering wheel from a direct line.

3. In combination, a steering wheel, a disk retarder, a stem having the retarder connected therewith, a spring normally holding the retarder in a given position, a stop adjustable with reference to the spring and stem to fix the normal position of the retarder, a roller carried by said stem, and an inclined track to effect depression of the retarder upon changing or moving the steering wheel from a direct line.

4. In combination with a steering wheel of a road machine, a retarder or anti-slipping device coöperating therewith and spring pressed upwardly, and stationary means against which a portion of the anti-slipping device is adapted to engage when the steering wheel turns, so as to depress the said device.

5. The combination with the steering wheel of a road machine, of a retarder or anti-slipping device coöperating therewith, a stem carrying said retarder, a support in which said stem is slidingly mounted to move in a longitudinal direction, the upper end of the stem protruding through the support, a spring incased in said support and connected to said stem to move same upwardly, and means engaging the upper end of the stem upon a turn of the wheel to the right or left and adapted to move said stem downwardly.

6. The combination with a steering wheel of a road machine of a retarder in the form of a disk, a stem adapted to carry said disk, a box in which said stem is longitudinally slidable, said stem being provided with a stop and projecting beyond the stop through the upper end of the box, a spring in said box and bearing against said stop, and an inclined track adapted to be engaged by the upper end of the stem upon a turn of the steering wheel to the right or left, as and for the purpose set forth.

In testimony whereof I affix my signature in presence of two witnesses.

ISAIAH N. MITCHELL. [L. S.]

Witnesses:
    CLEBERT DEROUEN,
    PLACID DEROUEN.